June 24, 1941.    S. J. LEVINE ET AL    2,247,060
GAS FURNACE CONTROL
Filed July 20, 1938    2 Sheets-Sheet 1
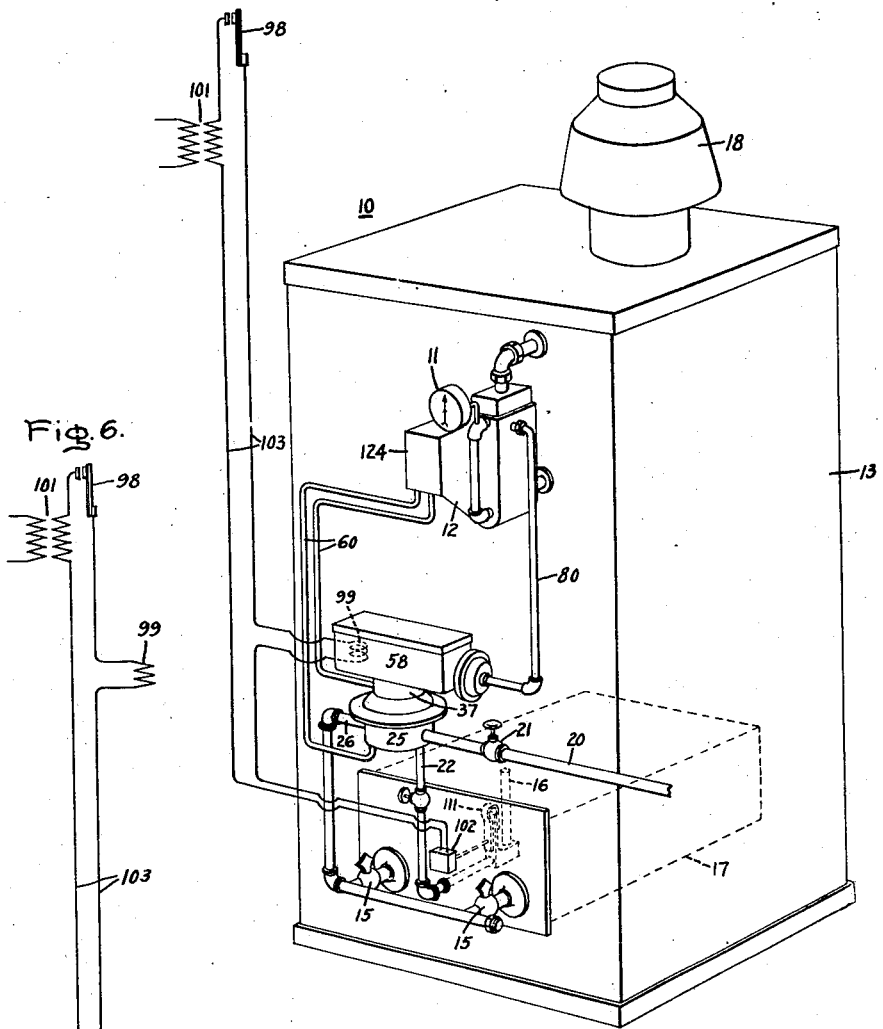
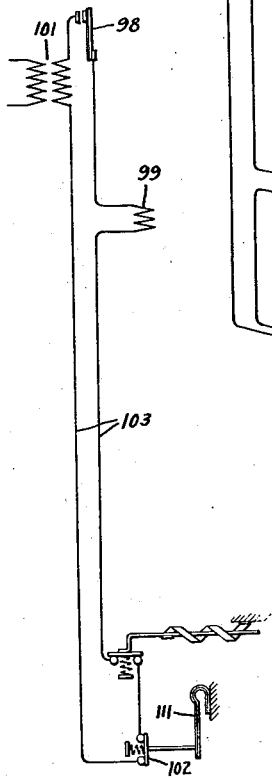
Inventors:
Samuel J. Levine,
William J. King,
by  Harry E. Dunham
Their Attorney.

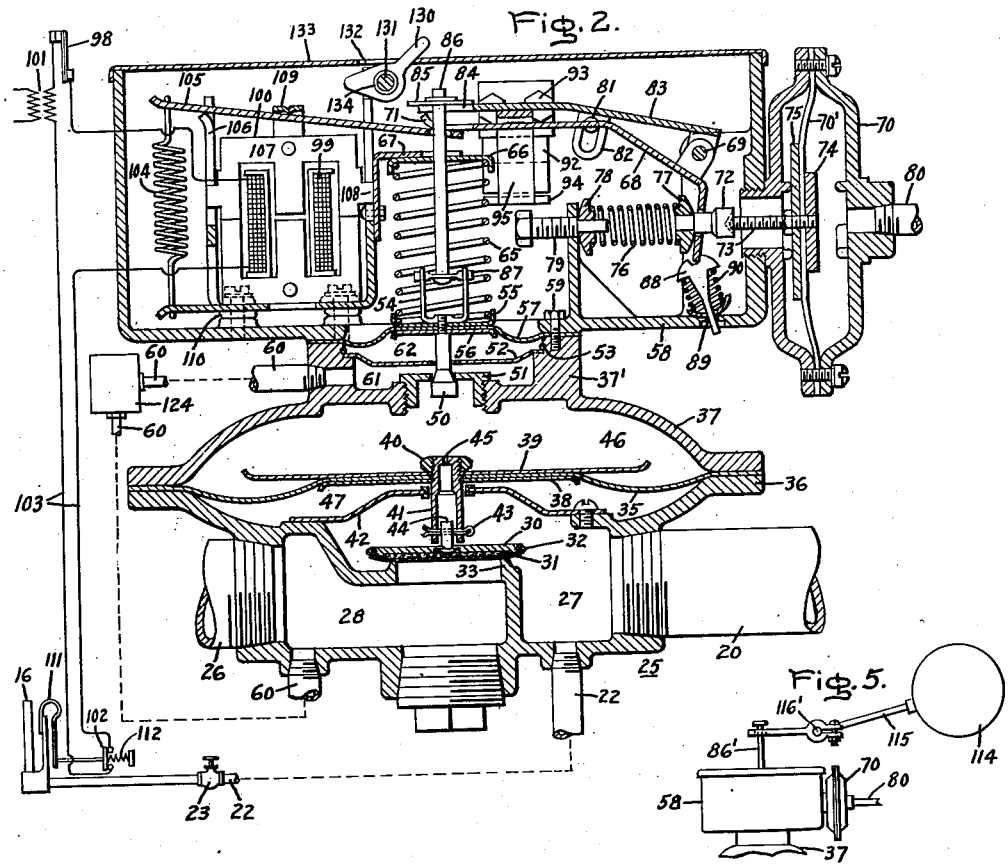
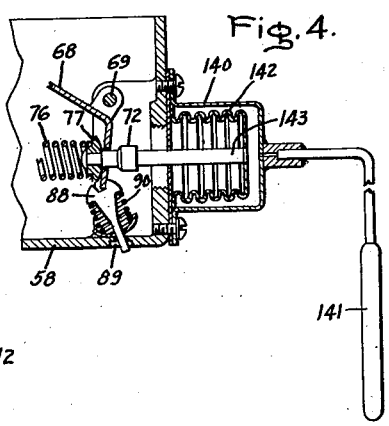
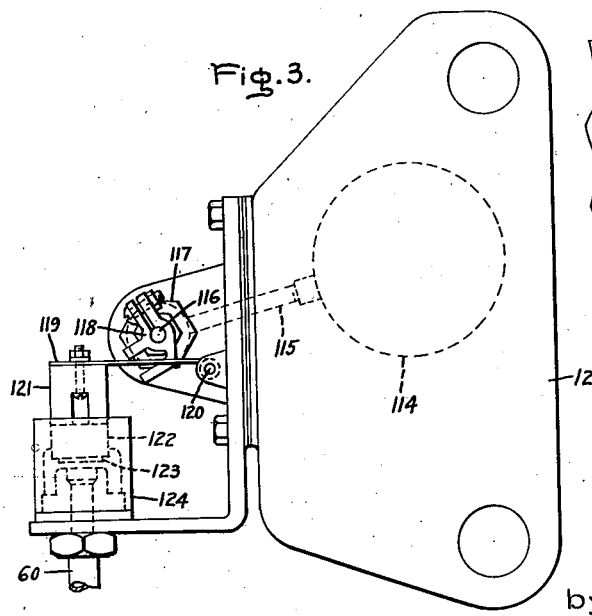

Patented June 24, 1941

2,247,060

UNITED STATES PATENT OFFICE 2,247,060

GAS FURNACE CONTROL

Samuel J. Levine and William J. King, East Orange, N. J., assignors to General Electric Company, a corporation of New York Application July 20, 1938, Serial No. 220,230

13 Claims. (Cl. 236—9)

The invention relates to gas furnace control. The principal object is to provide an improved single main and auxiliary gas valve control system and apparatus for automatically regulating the pressure and automatically starting and stopping the flow of gas to a furnace in response to a plurality of different conditions although certain of the broad features may be used with advantage in other fluid flow control service.

A specific object is to provide improved pressure regulating and selective condition responsive on-off single auxiliary valve control means for rendering a main gas furnace valve capable of performing a multiplicity of control functions. In accordance with the invention the main valve functions as a pressure regulator of the gas supplied to the furnace, as an automatic variable burner flame control responsive to variations in steam pressure, air or water temperature or other variable condition of the furnace, as a thermostatic furnace control valve, as a manual furnace control valve, and as an automatic safety limit furnace control valve responsive to abnormal furnace conditions such as boiler low water, excess steam pressure, excess furnace temperature or the like and also as a safety pilot flame failure furnace control valve. Thus with the improved pressure regulating and selective condition responsive on-off control means of the present invention the single main gas furnace control valve is able to perform all of the necessary furnace control functions under both normal and abnormal conditions.

A further object is to render each of the automatic condition responsive on-off safety furnace control means independent of the other safety control means and selectively predominant over the thermostatic or manual or variable burner flame control means and also render the thermostatic control means selectively predominant over both the manual control means and the variable burner flame control means. This prevents conflict between the various control means and insures safe control of the furnace by the single main valve under both normal and abnormal conditions.

Another object is to combine the automatic pressure regulating and selective condition responsive on-off main valve control means into a unitary control structure arranged for cooperation with different sizes of main gas flow control valves to meet widely varying gas furnace flow control requirements. Thus only a different size main valve is required to adapt the improved control to a furnace of any capacity.

One of the specific objects is to improve the pressure regulating function of the main valve by utilizing a relatively small and sensitive pressure responsive auxiliary valve for controlling the pressure differential effective upon a larger differential pressure responsive operating means for the main valve with both valves cooperating automatically to regulate the pressure to which the small auxiliary valve is responsive. In this way very sensitive pressure regulation can be obtained. A still further specific object is to provide a special restricting pressure change arrangement for stabilizing the operations of both the small and the large valve thereby preventing hunting and overshooting in the pressure regulation. Other specific objects will appear in the following description.

A better understanding of the principle of the invention and the best mode in which the applicant has contemplated applying that principle may be had from the accompanying drawings in which Fig. 1 shows a gas fired steam boiler furnace provided with a preferred form of control apparatus embodying the present invention; Fig. 2 is a diagram showing schematically the multiple function gas furnace control apparatus illustrated in Fig. 1 with many of the parts shown in section in order to reveal more fully the details of construction; Fig. 3 is an enlarged and amplified showing of the low water control means shown diagrammatically in Fig. 2; Fig. 4 shows a modification of certain parts of the control system and apparatus of Fig. 2 suitable for hot water boiler furnace or hot air furnace control service; Fig. 5 shows a modification of the gas furnace control system of Fig. 2 wherein all of the furnace controlling functions are consolidated into a more simplified control structure; and Fig. 6 shows a further modification of the control system of Fig. 2 whereby the variable flame control may be eliminated and the room thermostat, the pilot flame failure thermostat and the excess furnace temperature thermostat all control the main gas valve through the agency of an electromagnet.

In Fig. 1 the gas-fired furnace 10 is shown as of the steam boiler type provided with the steam pressure gauge 11 and the low water cutoff safety device 12. The furnace 10 may be provided with a furnace jacket 13 in accordance with modern practice preferably with heat insulating material between the furnace and the jacket. As the details of the steam boiler construction are not of importance to the present invention, they are not shown.

The main gas burners 15 and the pilot burner 16 are shown mounted in a combustion space 17 at the bottom of the furnace 10, which space ordinarily is closed by a removable door, not shown. The products of combustion after passing over the heat absorbing surfaces of the boiler furnace 10 are conducted to the chimney through the flue connection 18. This flue connection is shown as of the usual back draft protective type.

Gas is supplied to the burners 15 and 16 of furnace 10 from the main gas supply line 20 having the usual emergency manual cutoff valve 21 therein. The pilot burner 16 is continuously supplied with gas from the pipe 20 through the pipe 22 as shown more clearly in Fig. 2. The needle valve 23 is provided in pipe 22 for adjusting the size of the pilot flame.

The main gas control valve 25 controls the flow of gas from the gas supply main 20 to the main burners 15 through the pipe 26. In accordance with the improvements of the present invention, the single main valve 25 is provided with means for starting and stopping the supply of gas to the main burners 15 of the furnace automatically under the control of a room thermostat 98 also with means for maintaining a substantially constant gas pressure at the burners 15 irrespective of wide variations in pressure in the supply main 20, also with means for automatically stopping the supply of gas to the burners 15 in response to a plurality of different abnormal conditions of the furnace such as failure of the pilot flame, low water in the boiler, excessive pressure in the boiler and also with means for automatically regulating the pressure of the gas supplied to the main burner 15 inversely in accordance with variations of the steam pressure in the boiler between predetermined normal operating limits; and also with means for manually starting and stopping the supply of gas to burners 15 in case of failure of the room thermostat control.

*Main gas control valve*

As shown in detail in the cross section diagram of Fig. 2, the main gas control valve 25 for the furnace 10 is of the differential gas pressure diaphragm operated type. The main valve inlet chamber 27 is connected to the gas supply main 20 which constitutes the usual variable pressure gas supply source. The valve outlet chamber 28 is connected by pipe 26 to the burners 15. The movable main valve element 30 controls under all conditions the flow of gas from the valve inlet chamber 27 to the outlet chamber 28. This movable valve element 30 preferably is in the form of a circular disc provided with a flexible facing 31 of leather or other suitable material held in place by the snap ring 32 which fits into a circumferential groove in the element 30. The bottom face of valve element 30 is recessed with the flexible facing 31 extending over the recess in order to insure a good gas tight seal with the valve seat 33.

The movable valve element 30 is operated by the circular differential pressure responsive diaphragm 35 preferably formed of special flexible impervious synthetic material to insure long life. Diaphragm 35 is clamped at its periphery between the abutting edges of the lower valve casing 36 and the upper valve casing 37. The center of diaphragm 35 is clamped between the circular supporting plates 38 and 39 which are of unequal diameters and are pressed together by the jam nut 40 on the upper end of the valve stem 41. Stem 41 extends with slight clearance through the central opening in the baffle plate 42. The valve stem 41 is hollow and the valve element 30 is loosely supported upon the lower end thereof by the cotter pin 43 extending through the post 44. A restricted orifice 45 is formed at the upper end of the hollow valve stem 41 to admit gas at a restricted rate from the inlet chamber 27 through the interior of the valve stem 41 into the space 46 above the diaphragm 35. Gas is also admitted at a restricted rate from the inlet chamber 27 through the clearance between the outside of the valve stem 41 and the baffle 42 into the space 47 below the diaphragm 35.

The differential pressure responsive diaphragm operating arrangement is such that when the pressure of the gas on the opposite sides of the diaphragm 35 in the spaces 46 and 47 is substantially equalized, the combined weight of the supporting plates 38, 39, the valve element 30 and valve stem 41 is effective to bias the valve 30 to the closed position. However, when the gas pressure in space 47 materially exceeds the gas pressure in space 46, the diaphragm 35 responds to the differential in pressure on the opposite sides thereof to open the valve element 30 against its bias.

*Pressure regulation*

The value of the gas pressure in space 47 below diaphragm 35 varies only with the pressure variations of the gas supply source 20 while the gas pressure in space 46 above diaphragm 35 is varied by operation of the auxiliary pressure regulating valve 50. This enables the auxiliary pressure regulating valve 50 to act as a pilot control valve for the main valve 30. Thus when valve 50 is closed the main valve 30 is closed by the building up of pressure in space 46. When valve 50 is fully opened, main valve 30 is also fully opened by the reduction in pressure in space 46. And when auxiliary valve 50 is only partly open, main valve 30 also will be only partly open to maintain a constant gas pressure in the main burner supply pipe 26 as will be more fully explained hereinafter.

In accordance with the present invention, the auxiliary pressure regulating valve 50 cooperates with the valve seat 51 which is mounted directly in the upper casing 37 of the differential pressure operated main valve 30. Also this auxiliary valve 50 is connected to be operated in a number of different ways to control the operation of the main valve.

The stem of auxiliary valve 50 extends upwardly with slight clearance through the opening formed in the baffle plate 52 which is removably mounted by means of the snap ring 53 in the annular shoulder 37' formed directly on the upper casing 37 of the main valve. The upper end of valve 50 is threaded into the clevis 54 so as to clamp the two supporting plates 55 and 56 on opposite sides of the flexible pressure responsive diaphragm 57. The periphery of the pressure responsive diaphragm 57 is clamped between the upper part of the annular shoulder 37' and the control housing 58 by means of the stud bolts 59.

The pressure responsive diaphragm 57 is connected to operate auxiliary valve 50 responsively to the gas pressure variations in the outlet chamber 28 of the main valve 30 by means of the pipe connection 60. Pipe 60 normally communicates all pressure variations in chamber 28 to the chamber 61 through the normally open low water cutoff valve 124 and thence through the clearance around the stem of valve 50 into the space 62 below the diaphragm 57. A variable loading spring 65 for controlling the response of diaphragm 57 to pressure variations in space 62 is seated at its lower end on the diaphragm support 55 and is provided at its upper end with the sliding seat 66 which engages with an adjustable stop 67.

The pressure responsive diaphragm 57 by controlling the position of the auxiliary valve 50 causes the main valve 30 to be operated to maintain constant the pressure of the gas supplied to the burner from the main valve outlet chamber 28 through pipe 26 in the following manner. In case the gas pressure in the outlet chamber 28 should increase slightly, this increase of pressure is transmitted through pipe 60, normally open valve 124, chambers 61 and 62 to diaphragm 57 which thereupon operates against the force of the loading spring 65 to move auxiliary valve 50 slightly toward the closed position. An improved multiple compound gas pressure regulating action results.

In the first place both the slight increase in gas pressure in chamber 61 and the slight closure of valve 50 causes the flow of gas from chamber 46 through the auxiliary valve 50 to decrease slightly. Since the two gas flow regulating actions are compounded and thus reenforce each other, this compound action quickly results in a slight increase in pressure in the space 46. This slight increase in pressure in space 46 causes diaphragm 35 to move the main valve 30 slightly toward the closed position. As a result the flow of gas past the main valve 30 into the outlet chamber 28 is slightly restricted thereby reducing the excess pressure existing in the outlet chamber 28. This reduction of pressure in chamber 28 is then transmitted through pipe 60, valve 124, chambers 61 and 62 to the diaphragm 57 which thereupon responds to permit the loading spring 65 to return auxiliary valve 50 towards its initial position.

In the second place a complementary but more direct gas pressure regulating action results from the slight movement of the auxiliary valve 50 toward its closed position in addition to that described above. Since the auxiliary valve 50 provides a variable restriction to the flow of gas from the upper diaphragm chamber 46 into chamber 61, any movement of the auxiliary valve 50 necessarily tends to inversely vary the gas pressures on the opposite sides thereof. Thus whenever the gas pressure in chamber 46 is increased by movement of the auxiliary valve 50 as above described, there simultaneously occurs a complementary inverse gas pressure regulating action directly tending to decrease the gas pressure in the chamber 61. Such decrease in gas pressure in chamber 61 is transmitted to chamber 62 where the pressure regulating diaphram 57 becomes responsive thereto. Thus due to the inverse gas pressure regulating action on the opposite sides of the auxiliary valve 50 provided in the improved combination disclosed, both the main valve 30 and the auxiliary valve 50 become separately and jointly effective to regulate the gas pressure in chamber 62 to which the gas pressure regulating diaphragm 57 responds. With both the main and auxiliary valves cooperating automatically to regulate the pressure to which the diaphragm 57 responds, a much more sensitive, accurate, and stabilized pressure regulation is obtained.

Any slight decrease in pressure in the outlet chamber 28 acts in just the opposite way to produce a slight opening of the auxiliary valve 50 and a corresponding slight opening of the main valve 30 to correct the pressure deficiency in outlet chamber 28. In this way the pressure in outlet chamber 28 is maintained substantially constant.

The baffle plate 42 serves to stabilize movement of the main differential pressure responsive operating diaphragm 35 and the baffle plate 52 similarly serves to stabilize movement of the furnace gas pressure responsive diaphragm 57. Hence, any tendency of the main and auxiliary valves to set up oscillations or hunting is effectively suppressed and a smooth and accurate pressure regulating action is obtained. Due to the small size of the pressure responsive diaphragm 57 and of the auxiliary valve 50 a very sensitive response to slight pressure variations in the main valve outlet chamber 28 is obtained. Moreover, the sensitivity is increased by the automatic regulating action inherently resulting from the pressure variations in chamber 28 being directly effective to increase or decrease the flow of gas through the auxiliary valve 50 independently of any movement of the auxiliary valve itself. This insures a very rapid response of the main differential pressure responsive diaphragm 57 in case of any rapid variation of pressure in the valve outlet chamber 28 which might occur temporarily due to some unusual condition such as a rapid variation in the pressure of the gas supply source 20.

*Variable flame control*

The improvements of the present invention enable the force of the loading spring 65 acting on the pressure regulating diaphragm 57 to be varied in accordance with a predetermined variable condition of the furnace such, for example, as steam pressure in a boiler furnace or temperature in a hot water or hot air furnace. In this way, the value of the gas pressure automatically maintained in the valve outlet chamber 28 is varied so as to cause the flame of the furnace burner to vary in size correspondingly. Thus the burner flame may be increased as the boiler pressure or temperature decreases and decreased as the temperature or pressure increases. This variable flame control enables the heat output of the furnace to be varied over relatively wide normal operating limits. This provides many practical operating advantages over the ordinary room thermostat "on" and "off" type of gas furnace control.

In the embodiment of the invention for controlling a steam boiler furnace as illustrated in Fig. 2, both the variable flame control in accordance with boiler steam pressure variations between normal operating limits and also excessive boiler steam pressure safety control are effected by means of the control lever 68 which is pivotally mounted upon the shaft 69 and is arranged to be operated by the boiler steam pressure responsive device 70. The left-hand end 71 of lever 68 is forked so as to straddle the adjustable stop 67 and engage with the sliding seat 66 of the loading spring 65. The other end of lever 68 carries a socket member 72 which removably receives the end of the screw 73 by means of which the supporting plates 74 and 75 are clamped to the center of the operating diaphragm 70' of the boiler steam pressure responsive device 70. An adjustable compression spring 76 has the seat 77 at one end thereof secured to the socket member 72 and the seat 78 at the other end thereof mounted on the adjusting screw 79. Thus adjustment of screw 79 serves to vary the pressure on diaphragm 70' required to operate lever 68. The steam pressure of the boiler furnace is transmitted by pipe 80 to the pressure responsive device 70. The operation under excess steam pressure conditions will first be described before the normal variable flame control operation is described.

*Excess steam pressure control*

In case of abnormal or excessive boiler steam pressure, the diaphragm 70' operates the lever 68 to close the auxiliary valve 50 entirely and thereby effect the closure of the main gas control valve 30 to stop the supply of gas to the furnace. In this abnormal steam pressure operation diaphragm 70' and lever 68 are moved to the positions shown in the drawings. During this movement the pin 81 carried by lever 68 engages the upper end of the slotted arm 82 carried by lever 83 which latter is also pivoted on shaft 69 but is free to rotate independently of lever 68. When lever 83 is raised, the forked end 84 thereof is carried into engagement with the washer 85 secured at the upper end of the rod 86 which latter is connected at its lower end with the clevis 54 by means of the cross bar 87. In this way the joint upward movement of the levers 68 and 83 raises the rod 86 and clevis 54 and moves diaphragm 57 against the force of the loading spring 65 with the sliding seat 66 thereof resting on the stop 67 until the auxiliary valve 50 closes upon its seat 51. The closure of auxiliary valve 50 causes the gas pressure in the space 46 above the diaphragm 35 to build up to a value equal to the gas pressure in space 47 below the diaphragm. Under these conditions the main gas furnace control valve 30 closes in accordance with its bias.

In order to prevent restarting of the furnace until the boiler steam pressure decreases considerably below the excessive value at which the furnace was shut down, special biasing means are provided for controlling the operation of the levers 68 and 83. Thus by means of such special biasing the main gas valve 30 cannot be reopened until the boiler pressure approaches its normal minimum operating limit. Also such special biasing means insures that in restarting the furnace, the pressure of the gas supplied to the furnace is held by operation of the pressure regulator near the maximum limit. This facilitates the proper starting of the main burner of the furnace and prevents popping or flashback which might occur in case the furnace should be restarted with the gas pressure held near the minimum limit.

The special biasing means operating on lever 68 consists of the overcenter toggle arm 88 which is pivotally mounted in a suitable opening 89 formed in the control housing 58. The compression spring 90 biases the notched upper end of the toggle arm 88 into pivotal engagement with the lower end of lever 68.

The special biasing means for lever 83 consists of the permanent magnet 92 which is adjustably mounted upon the back wall of the control housing 58 by means of the adjustable mounting screws 93. This permanent magnet 92 is adjusted to cooperate with the magnetic armature 94 which is carried by the arm 95 secured to and extending downwardly from the lever 83.

The combined biasing forces of the permanent magnet 92 and of the toggle arm 88 are such that the lever arm 83 is held in the position in which it is shown until the boiler steam pressure effective on diaphragm 70' has decreased sufficiently to approach the lower normal operating limit at which the maximum loading of spring 65 is obtained. As the steam pressure on diaphragm 70' decreases, the arm 68 is moved by compression spring 76 to carry the pin 81 toward the lower end of the slotted arm 82. However, during this movement of arm 68 valve 50 is kept closed by the attraction of magnet 92 on armature 94 to hold lever 83 in engagement with the washer 85. When the steam pressure effective on diaphragm 70' is reduced to a predetermined low value, the toggle arm 88 is carried overcenter. This enables the compression spring 90 to act with instead of against compression spring 76 on lever 68 and quickly carry the pin 81 into engagement with the end of the slot in arm 82 and thereby break the armature 94 away from the attractive force of the permanent magnet 92. The lost motion provided between the lower end of lever 68 and the socket member 72 also permits the overcenter spring 90 to carry the forked end 71 of lever 68 into engagement with the sliding seat 66 of the loading spring 65 and compress this loading spring almost to its maximum loading condition. This causes the auxiliary valve 50 to open wide. The lost motion along element 72 provides for a wide differential between the excess steam pressure required to stop operation of the furnace and the relatively low steam pressure required to effect restarting of the furnace.

The wide opening of auxiliary valve 50 in restarting the furnace produces a corresponding wide opening of the main valve 30, thereby insuring that a relatively high gas pressure is quickly built up in the outlet chamber 28 and the pipe 26 which supplies gas to the main burner. This insures that successful ignition of the gas is effected at the burners of the furnace by the pilot flame without danger of popping or backfire into the burner air and gas mixing chamber as is likely to occur upon igniting the burners under low gas pressure conditions.

*Variable flame and excess pressure operation*

In case the operation of the burner in the furnace should cause the steam pressure of the boiler to increase the force exerted by diaphragm 70' increases correspondingly. This moves the lever 68 against the opposing forces of the compression springs 76 and 90 so as to decrease the loading on the gas pressure regulating spring 65. As a result the auxiliary valve 50 controls the main valve 30 to reduce the pressure of the gas supplied to the furnace burner and thereby effect a corresponding reduction in the size of the burner flame. In case the resulting decrease in the burner flame should cause the steam pressure in the boiler to decrease, the diaphragm 70' responds to operate lever 68 so as to increase the loading of spring 65 and thereby effect an increase in the pressure of the gas supplied to the furnace.

However, in case the boiler steam pressure should continue to increase, the loading of spring 65 is then progressively decreased correspondingly until the seat 66 engages with the adjustable stop 67 which determines the minimum limit of pressure of the gas to be supplied to the furnace. Upon a predetermined further increase of the boiler steam pressure to an excessive value, the toggle arm 88 is carried overcenter and quickly operates lever 68 with a snap action to raise lever 83 so as to engage washer 85 and effect the closure of valve 50. This causes the main valve 30 to close and cut off the supply of gas to the burner at the same time armature 94 is attracted by magnet 92 to hold lever 83 in its raised position in which it is shown in the drawings.

Room thermostat control

Whenever the temperature of the space heated by the furnace exceeds the desired value, the room thermostat 98 by opening its circuit controlling contacts, operates to effect the closure of the main gas valve 30 to stop further generation of heat. This deenergizes the operating winding 99 of the electromagnet 100 which is connected to the low voltage windings of the transformer 101 or other suitable source of supply through the pilot flame safety switch 102 and conductors 103. Upon deenergization of electromagnet 100, the biasing spring 104 thereof is free to rotate the lever 105 which is pivotally mounted upon the magnet supporting frame 106 to engage the free end of lever 105 with the washer 85 after taking up the lost motion therebetween and thereby raise the rod 86, clevis 54, and close the auxiliary valve 50. The closure of valve 50 results in the closure of the main valve 30 in the manner previously described.

The closure of auxiliary valve 50 will always occur upon the deenergization of electromagnet 100 independently of the control effected by the pressure regulating diaphragm 57 and the variable flame control effected by the steam pressure responsive diaphragm 70'. This is due to the fact that the electromagnet biasing spring 104 is made strong enough to overcome the force of the loading spring 65 even under the maximum loading condition of spring 65. Also it is due to the fact that the end of lever 105 is of such size as readily to pass between the forked ends of the levers 68 and 83 into engagement with the washer 85 to lift valve 50 to the closed position.

Upon reclosure of the contacts of the room thermostat 98 due to a decrease in the room temperature below the value to which the thermostat is adjusted to respond, the electromagnet 100 is again energized and the moving magnetic element 107 thereof is attracted and operates the lever 105 against the force of the biasing spring 104 to place the control of operation of the auxiliary valve 50 again under the joint control of the gas pressure responsive diaphragm 57 and the steam pressure responsive diaphragm 70. As shown the movable magnetic element 107 is provided with suitable guides 108 which slide in slots formed in the magnet frame 106. The magnetic element 107 is operatively connected with the arm 105 by means of the pivot strap 109. The magnet frame 106 preferably is mounted upon suitable resilient elements 110 formed of rubber or the like so as to prevent transmission of any chattering or magnetic hum from the electromagnet structure to the control casing 58.

Pilot flame failure control

The temperature responsive operating element 111 of the pilot flame safety switch 102 preferably is formed of bimetallic material and mounted so as to be responsive to the temperature of the pilot burner 16. As long as the pilot burner 16 remains lighted, the continued heating of the element 111 maintains the switch 102 in the closed position against the bias of spring 112. In case the flame of the pilot burner 16 goes out, the resulting cooling of element 111 operates switch 102 in accordance with the bias of spring 112 thereby insuring that the electromagnet 100 is deenergized and the auxiliary valve 50 closed. Thus any failure of the flame of the pilot burner 16 effectively insures closure of the main valve 30 to cut off all further supply of gas to the furnace.

Boiler low water control

Upon the occurrence of low water conditions in the boiler furnace 10, the supply of gas to the furnace burner is cut off in the following manner. The float 114 follows the water level inside the casing of the low water cutoff device 12 which communicates at the top and bottom with the interior of the boiler respectively above and below the normal water level line of the boiler. The float 114 is carried by the arm 115 fixedly mounted upon shaft 116 which extends through a suitable stuffing box 117 so as to permit the float 114 to rise and fall with the level of the water in the boiler. The bifurcated operating arm 118 is adjustably clamped to the free end of the shaft 116 in lost motion operating relation with the lever 119 pivotally mounted on the pin 120. The permanent magnet 121 is carried upon the free end of the lever 119 in cooperating relation with the magnetic armature 122 of a valve 123 enclosed within the valve housing 124 which is connected in the pipe 60 to control communication between the outlet chamber 28 of the main valve and the gas space 61 of the auxiliary valve.

Under all normal water conditions in the boiler, the permanent magnet 121 attracts armature 122 to hold the valve 123 open thereby providing free communication between the chamber 28 and the space 61. In case the water in the boiler is lowered toward an unsafe level, the float 115 rotates the shaft 116 thereby taking up the lost motion between operating arm 118 and lever 119. As the unsafe water level is reached, the continued rotation of shaft 116 engages the lower fork of arm 118 with lever 119 to raise the permanent magnet 121 out of attractive relation with the armature 122 of the valve 123. This permits valve 123 to close in accordance with its bias and stop all further flow of gas from the space 61 into the chamber 28. As a result gas pressure builds up in the space 46 even though the pilot valve 50 remains open thereby causing the main valve 30 to close in accordance with its bias. This stops all further operation of the furnace under control of pilot valve 50 until normal water level conditions in the boiler are restored.

Emergency manual control

Emergency manual control of the operation of furnace 10 may be obtained by means of the lever 130 whenever failure of electrical power renders the automatic room thermostat control inoperative. The manual control lever 130 is pivotally mounted upon the shaft 131 with the upper end thereof extending through a slot 132 formed in the cover 133 of the control casing 58. By manually operating the protruding end of the lever 130, the lower end thereof is carried into wedging engagement with the pivoted lever 105 so as to operate the latter against the bias of spring 104 independently of the energization of electromagnet 100. The wedging frictional engagement between levers 105 and 130 serves to hold lever 130 in its operated position against the bias of torsion spring 134.

As soon as the failure of power is overcome so that transformer 101 again becomes energized, the energization of electromagnet 100 by the room thermostat 98 pulls the lever 105 out of frictional engagement with the lower end of the manual operating lever 130. This permits the torsion spring 134 to return the manual lever 130 to the off position in which it is shown in the drawings.

From the foregoing description of the various normal and abnormal furnace control conditions it should be clear that the present invention provides an improved gas furnace control combination enabling the single main control valve 30 to control the flow of gas to the furnace 10 effectively and safely under all conditions. Moreover, the pilot flame failure safety control, the boiler low water safety control, and the boiler excess steam pressure safety control, each are capable of exercising control to stop operation of the furnace independently of each other and also independently of any control exercised by the pressure regulating control, the room thermostat, or the manual control. This improved control combination insures safe operation of the boiler furnace at all times.

Furthermore, the automatic gas pressure regulating control and the variable flame control responsively to variations of the boiler pressure within normal limits cooperate to maintain the desired variable size of burner flame independently of any pressure variations which may occur in the gas supply source. This insures a uniform control of the furnace burner flame substantially independently of the pressure of the gas supply source.

*Hot water and warm air furnace control*

Fig. 4 shows the modification necessary to adapt the improved control of the present invention to hot water boiler or warm air furnace variable flame and excess temperature control service. In such service low water control is not required. Hence the low water control valve 123 may be eliminated entirely and the outlet chamber 28 of the main valve connected directly to the gas space 61 of the auxiliary valve 50. Also in such service the steam pressure responsive diaphragm 70 is replaced by a temperature responsive expansible bellows device 140 having the temperature responsive bulb 141 thereof responsive to the temperature of the water in the hot water boiler furnace or the temperature of the air in the air heating chamber of the hot air furnace. The bulb 141 is filled with a liquid which vaporizes as the temperature increases to increase the force exerted by the bellows element 142. This force is transmitted by the rod 143 to the socket member 72 which is carried by the control lever 68. In this case variations in temperature of the bulb 141 between normal operating limits and also under excess temperature conditions control the operation of the lever 68 in precisely the same manner as variations in pressure upon the diaphragm 70' as previously described. Thus the temperature responsive device 140 operates to vary the size of the burner flame upon variation of the furnace temperature between predetermined limits and also functions upon the occurrence of excess temperatures to effect the closure of the auxiliary valve 50 with a corresponding closure of the main valve 30. Except for the changes just noted the entire control as previously described operates in exactly the same way to control the operation of the hot water boiler furnace or the hot air furnace under both normal and abnormal conditions.

To apply the improved control of the present invention to different furnaces having widely different rates of gas consumption, all that is necessary is to provide a different size of the main valve 30 and its operating diaphragm to correspond with the size of the furnace. The control mechanism itself remains the same for any size of furnace.

Fig. 5 shows a modification in which the low water control valve 124 is eliminated and the operating shaft 116' of the low water responsive device 12 is connected mechanically to control the operation of the auxiliary valve 50. In this case the lowering of the float 114 due to low water conditions rotates the shaft 116' to raise the connecting rod 86' and thereby raise the rod 86, clevis 54, and the auxiliary valve 50 to the closed position. In this modification every one of the controlling functions both normal and abnormal are carried out through the agency of the auxiliary valve 50.

Various modifications may be made in the improved gas furnace control apparatus of the present invention without departing therefrom. In case it is desired, the variable flame and excess steam pressure or temperature control shown in Figs. 2 and 4 may be entirely omitted as, for example, in a warm air furnace provided with an electric motor driven air circulating blower where excess temperature protection may be obtained by simply connecting an ordinary type of normally closed furnace excess temperature switch in series circuit with the pilot flame failure protective switch shown in Fig. 2. In such case, the adjustable stop 67 is set to provide the proper operating excess pressure in the pilot chamber 28 at all times.

What we claim as new and desire to secure by Letters Patent of the United States is:

1. In combination, a gas furnace having a variable pressure gas supply source, control means for said furnace including a differential gas pressure operated valve for controlling the flow of gas from said source to said furnace and an auxiliary pressure responsive regulating valve for controlling the differential gas pressure effective on said first valve for maintaining the pressure of the gas supplied to the furnace substantially constant, means responsive to a condition of the furnace normally variable between limits for controlling the operation of said auxiliary valve to effect operation of the main valve to vary the pressure of the gas supplied to the furnace between corresponding limits, and snap action means rendered effective upon response of said furnace condition responsive means to an abnormal condition of the furnace for controlling operation of said auxiliary valve to effect operation of the main valve to stop the flow of gas from said source to said furnace.

2. In combination, a gas furnace for heating a space and having a variable pressure gas supply source, control means for said furnace including a differential gas pressure operated main valve for controlling the flow of gas from said source to said furnace, an auxiliary gas control valve provided with operating means responsive to the pressure of the gas supplied from said main valve to the furnace for controlling the differential gas pressure effective on said main valve to maintain said furnace gas pressure substantially constant, means responsive to a variable condition of the furnace having predetermined normal limits for controlling said auxiliary valve to effect operation of said main valve to vary the furnace gas pressure inversely in accordance with variations in said condition, means responsive to the temperature of said space for controlling said auxiliary valve to effect operation of said main valve to stop the flow of gas from said source to said furnace, and means responsive to an abnormal condition of the furnace cooperating with said responsive means to effect operation of said main valve to stop the flow of gas from said source to said furnace.

3. In a control for a gas furnace having a main burner and a pilot burner, the combination of a differential gas pressure operated valve for controlling the supply of gas to the main burner of the furnace, an auxiliary valve for controlling the differential gas pressure effective on said first valve, means responsive to the pressure of the gas supplied to the furnace for operating said auxiliary valve to maintain the furnace gas pressure substantially constant, means responsive to a condition of the furnace for regulating the operation of said pressure responsive means to vary the pressure of the gas supplied to the furnace, and means responsive to failure of the pilot flame for operating said auxiliary valve to effect closure of said main valve independently of the control of said pressure responsive and condition responsive means.

4. In a control for a gas furnace having a main burner and a pilot burner, the combination of a differential gas pressure operated main valve for controlling the flow of gas to the main burner, an auxiliary valve for controlling the differential gas pressure of said first valve, means responsive to the pressure of the gas supplied to the main burner for operating said auxiliary valve to maintain the furnace gas pressure substantially constant, means responsive to a condition appurtenant to the furnace for regulating the operation of said pressure responsive means to vary the pressure of the gas supplied to the furnace, thermostatically controlled means responsive to the heating action of said furnace for operating said auxiliary valve to effect closure of said main valve independently of the control of said pressure responsive and condition responsive means and means responsive to failure of said pilot burner cooperating with said thermostatically controlled means for operating said auxiliary valve to effect closure of said main valve.

5. In a gas furnace control, the combination of a main gas valve for controlling the flow of gas to the furnace and having differential pressure responsive operating means, an auxiliary valve responsive to the pressure of the gas supplied to the furnace for controlling the differential pressure effective on said main valve, thermostatic means for controlling said auxiliary valve to start and stop operation of the furnace means responsive to variations in a furnace condition between normal limits for effecting a corresponding variation in the pressure to which said pressure responsive auxiliary valve responds, and biasing means rendered effective upon response of said responsive means to a predetermined abnormal variation in said furnace condition and having a lost motion connection for operating said auxiliary valve to effect the closure of said main gas valve and maintain said valve closed until after said furnace condition becomes normal.

6. In a gas furnace control, the combination of a differential gas pressure operated valve biased closed and having a restricted passage for equalizing the pressure on the opposite sides of the diaphragm for controlling the flow of gas to the furnace from a variable pressure gas supply source, an auxiliary valve for controlling the differential gas pressure of said first valve, means responsive to the pressure of the gas applied to the furnace for controlling operation of said auxiliary valve to effect operation of said first valve to maintain said furnace gas pressure substantially constant, biasing means including a movable member having a lost motion connection for operating said auxiliary valve to effect closure of said first valve independently of the control of said pressure responsive means, and electromagnetic means for rendering said biasing means ineffective upon energization thereof.

7. In combination, a gas furnace having a variable pressure gas supply source and an ignition pilot supplied therefrom, a main control valve biased closed for stopping the flow of gas from said source to said furnace, gas pressure operated means connected to receive gas from said supply source for opening said valve to supply gas to said furnace for ignition by said pilot, an opposing gas pressure operated means for opposing the opening force of said first gas pressure operated means and having a connection with said supply source with a fixed restriction therein and another connection with the outlet of said main valve with a control valve for providing a variable restriction therein, a gas pressure responsive element connected to be responsive to the pressure of the gas supplied from said main valve to said furnace for operating said control valve to effect operation of said main valve to maintain said furnace gas pressure substantially constant, and means for operating said control valve independently of said gas pressure responsive operating element to stop and start operation of said gas furnace including a biasing means having a lost motion operating connection with said control valve and means for opposing said biasing means to maintain the lost motion in said connection.

8. In combination, a gas furnace having a variable pressure gas supply source and an ignition pilot supplied therefrom, control means for said furnace including a main gas pressure operated valve controlling the flow of gas from said source to said furnace for ignition by said pilot, an auxiliary gas control valve having operating means responsive to the pressure of the gas supplied from said main valve to said furnace for controlling the operation of said main valve to maintain the pressure of the gas supplied to said furnace substantially constant, thermostatic means for independently controlling said auxiliary gas control valve to start and stop operation of said gas furnace, and means responsive to an abnormal condition of the furnace and having snap action means provided with a lost motion operating connection for controlling said auxiliary valve to stop operation of said furnace independently of the control of said thermostatic means and said operating means.

9. In combination, a gas furnace having a variable pressure gas supply source and an ignition pilot supplied therefrom, a combined pressure regulating and cutoff valve for controlling the flow of gas from said source to said furnace and provided with variable loading means for varying the pressure of the gas supplied to the furnace, thermostatic means for controlling said valve to start and stop operation of said furnace, means responsive to variations in a condition of said furnace between predetermined limits for varying said loading means between corresponding limits, and biasing means rendered effective upon response of said condition responsive means to variation of said furnace condition above the upper one of said limits for operating said valve to cut off the supply of gas to said furnace and having a lost motion connection with said condition responsive means for maintaining said gas supply cutoff until said furnace condition approaches a predetermined value between said limits.

10. In combination, a fluid pressure regulating valve having an operating diaphragm and having biasing means for closing said valve upon equalization of the pressure on the opposite sides of said operating diaphragm, means providing a fluid pressure supply passage communicating between the inlet of said regulating valve and one side of said diaphragm to supply fluid pressure thereto for opening said valve against the closing force of said biasing means, means providing a fluid pressure supply passage with a restriction therein communicating between the said one side of said diaphragm and the other side thereof to equalize the fluid pressures thereon for closing said valve in accordance with its bias, means providing a fluid pressure control passage communicating between said other side of said operating diaphragm and the outlet of said main valve, a control valve providing a variable restriction in said fluid pressure control passage for inversely regulating the pressures on the opposite sides thereof, and an auxiliary diaphragm responsive to variations in the pressure of the fluid in said pressure control passage on the side of said control valve communicating with the outlet of said main valve for operating said control valve to maintain the gas pressure at the outlet of said regulating valve substantially constant.

11. In combination, a gas furnace having a variable pressure gas supply source, a differential gas pressure operated main valve for controlling the flow of gas from said source to said furnace, an auxiliary valve for controlling the differential gas pressure effective on said main valve to operate said main valve, an automatic gas pressure regulating means having a member movable responsively to the pressure of the gas supplied from said main valve to said furnace for operating said auxiliary valve to provide a regulating operation of said main valve for maintaining the furnace gas pressure substantially constant, and a plurality of automatic selective on-off control means, each responsive to a different operating condition of the furnace and each having a separate biasing means controlled thereby and provided with a separate lost motion operating connection with said auxiliary valve to free said valve for operation by said pressure regulating means when the corresponding furnace operating condition is normal and each of said biasing means being operable under the control of the corresponding automatic control means when the corresponding furnace operating condition becomes abnormal to take up the lost motion in the corresponding operating connection and operate said auxiliary valve to effect the closure of said main valve independently of the control of said pressure regulating means.

12. In a gas furnace control, the combination of a differential gas pressure operated main valve for controlling the flow of gas to a furnace from a variable pressure gas supply source, an auxiliary valve for controlling the differential gas pressure of said first valve to effect operation thereof, a pair of unequal opposing biasing means for said auxiliary valve with the weaker of said biasing means variable in accordance with the position of said auxiliary valve and the stronger of said opposing biasing means having a lost motion connection for operating said auxiliary valve against the maximum opposing bias of the weaker of said biasing means to effect closure of said main valve, electrically operated means for opposing said stronger biasing means to maintain lost motion in said connection and thereby effect operation of said auxiliary valve in accordance with the opposing variable bias of said weaker biasing means to effect opening of said main valve, and means responsive to the pressure of the gas supplied to the furnace for variably opposing the variable bias of said weaker biasing means to effect a regulating operation of said main valve to maintain said furnace gas pressure substantially constant.

13. In a pressure regulating fluid flow control, the combination of a differential fluid pressure responsive main valve for controlling the flow of fluid from a variable pressure source, an auxiliary valve for controlling the differential fluid pressure of said first valve, a pair of unequal opposing biasing means for controlling said auxiliary valve with the weaker of said biasing means variable in accordance with the position of said auxiliary valve and the stronger of said biasing means having a lost motion connection for operating said auxiliary valve against the maximum opposing bias of the weaker of said opposing biasing means to effect closure of said main valve, electrically operated means for opposing said stronger biasing means to maintain lost motion in said connection and thereby effect operation of said auxiliary valve in accordance with the variable opposing bias of said weaker biasing means to effect opening of said main valve, and means responsive to the pressure of fluid at the outlet of said main valve for variably opposing the variable bias of said weaker biasing means to effect operation of said first valve to maintain said outlet pressure substantially constant.

SAMUEL J. LEVINE.
WILLIAM J. KING.